(12) United States Patent
Fong et al.

(10) Patent No.: US 8,614,703 B1
(45) Date of Patent: Dec. 24, 2013

(54) AUTOMATIC BORDER ALIGNMENT OF OBJECTS IN MAP DATA

(75) Inventors: Chin Lung Fong, Stanford, CA (US); Joakim Kristian Olle Arfvidsson, Mountain View, CA (US); Mark D. Pilloff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 534 days.

(21) Appl. No.: 12/904,997

(22) Filed: Oct. 14, 2010

(51) Int. Cl.
*G09G 5/00* (2006.01)
*G09G 5/02* (2006.01)
*G06K 9/40* (2006.01)
*G06K 9/36* (2006.01)
*G06K 9/32* (2006.01)
*G01C 21/30* (2006.01)

(52) U.S. Cl.
USPC ........... 345/418; 345/581; 345/606; 345/611; 345/619; 345/657; 382/269; 382/276; 382/282; 382/300; 701/409; 701/455; 701/461

(58) Field of Classification Search
USPC ......... 345/418, 420, 581–583, 586, 606, 611; 345/618–619, 501, 522, 653, 657; 382/254–256, 268–269, 274, 276, 293, 382/295–300; 701/408–409, 454–455, 701/461–462
See application file for complete search history.

(56) References Cited

U.S. PATENT DOCUMENTS

| | | | | |
|---|---|---|---|---|
| 2003/0147553 A1* | 8/2003 | Chen et al. | ..................... | 382/154 |
| 2004/0263514 A1* | 12/2004 | Jin et al. | ......................... | 345/440 |
| 2007/0291994 A1* | 12/2007 | Kelle et al. | .................... | 382/110 |
| 2008/0310715 A1* | 12/2008 | Simske et al. | ................ | 382/173 |
| 2011/0249875 A1* | 10/2011 | Dewaele | ....................... | 382/128 |

* cited by examiner

*Primary Examiner* — Wesner Sajous
(74) *Attorney, Agent, or Firm* — Fenwick & West LLP

(57) ABSTRACT

A map editing system for processing map data in order to reduce discrepancies between geometric objects in the map data through the use of a cost function. The system selects a polygon shaped object (e.g., a park) for processing. The polygon may be located close to several polyline objects (e.g., streets) or other polygon objects so that discrepancies, such as open spaces, appear between the objects when displayed together in a map. To eliminate these discrepancies while maintaining the overall appearance of the polygon, the system repeatedly adjusts the border of the polygon until the attributes of the polygon minimize a cost function.

42 Claims, 10 Drawing Sheets

AUTOMATIC BORDER ALIGNMENT OF OBJECTS IN MAP DATA

FIELD OF THE INVENTION

The present invention relates to processing of map data and more specifically to reducing discrepancies between the borders of different geometric objects.

BACKGROUND

Digital maps are found in a wide variety of devices, including car navigation systems, hand-held GPS units, mobile phones, and in many websites such as GOOGLE MAPS and MAPQUEST. Although digital maps are easy to use from an end-user's perspective, creating a digital map is a difficult and time-consuming process. Every digital map begins with a set of raw data corresponding to millions of objects such as streets, intersections, parks, and bodies of water. The raw map data is derived from a variety of sources, such as the New York City Open Accessible Space Information System (OASIS) or the U.S. Census Bureau Topologically Integrated Geographic Encoding and Referencing system (TIGER). In many cases, data from different sources is inaccurate and out of date. Oftentimes the data from the different sources are in a format that is not suitable for use in a real map. Integrating data from these heterogeneous sources so that it can be used and displayed properly is an enormous challenge.

In particular, the borders of objects in the raw map data may run roughly parallel, but not exactly parallel, to the borders of other objects. For example, the border of an object that represent a park may be jagged, which prevents the park from being accurately aligned with the roads that surround the park, which may have straight borders. When borders of adjacent objects are not accurately aligned, a thin open area appears between objects when displayed on a map, resulting in sub-optimal map rendering quality.

SUMMARY

A map editing system processes map data to reduce discrepancies between geometric objects in the map data through the use of a cost function. The system selects a polygon shaped object (e.g., a park) for processing. The polygon may be located close to several polyline objects (e.g., streets) or other polygon objects so that discrepancies, such as open spaces, appear between the objects when displayed together in a map. To eliminate these discrepancies, the system repeatedly adjusts the border of the polygon until the attributes of the polygon minimize a cost function. The border of the polygon can be adjusted, for example, by adjusting the placement of the individual vertices that make up the border of the polygon.

In one embodiment, the cost function uses several heuristics to compute the cost of the polygon based on attributes of the polygon. Some of the heuristics maintain the original shape of the polygon by penalizing changes to the polygon. Other heuristics eliminate open spaces by penalizing a polygon if it is not aligned with neighboring objects. Other heuristics improve the visual appearance of a polygon by penalizing shapes with rough borders. By balancing these factors with a cost function, the system is able to eliminate discrepancies between objects in the map data without overly distorting their appearance.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
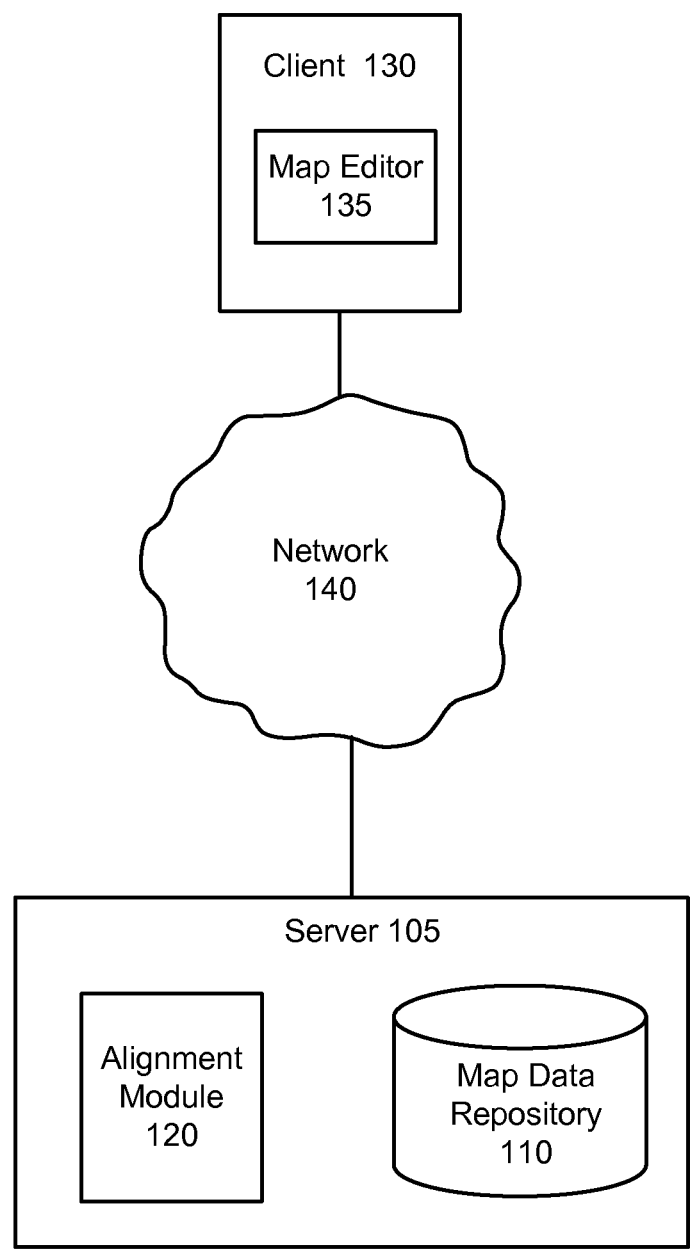
FIG. 1 is a high-level block diagram of a computing environment according to one embodiment.

FIG. 1 is a high-level block diagram that illustrates a computing environment for reducing discrepancies between geometric shapes, according to one embodiment of the present disclosure. A shown in FIG. 1, the computing environment includes a client 130 that communicates with a server 105 through a network 140. The network 140 includes but is not limited to any combination of a LAN, MAN, WAN, mobile, wired or wireless network, a private network, or a virtual private network. While only one client is shown to simplify and clarify the description, it is understood that very large numbers of clients are supported and can be in communication with the server 105.

Both the server 105 and the client 130 are computer systems that comprise a CPU, memory, network interface, peripheral interfaces, and other well known components. The server 105 can be implemented on either a single computer, or using multiple computers networked together. The server 105 is adapted to execute computer program modules, such as alignment module 120, for providing functionality described herein. As used herein, the term "module" refers to computer program logic used to provide the specified functionality. Thus, a module can be implemented in hardware, firmware, and/or software. In one embodiment, program modules are stored in on a storage device, loaded into memory and non-transitorily stored therein, and executed by a processor or can be provided from computer program products that are stored in tangible non-transitory computer-readable storage mediums (e.g. RAM, hard disk, or optical/magnetic media).

The server 105 includes a map data repository 110 that contains map data for generating a digital map. The map data repository 110 is illustrated as being stored in server 105. Alternatively, many other configurations are possible. The map data repository 110 does not need to be physically located within server 105. For example, the map data repository 110 can be located in external storage attached directly to the server 105, or can be accessed by the server 105 through the network 140 that connects the server 105 to the map data repository 110.

In the map data, two dimensional objects (e.g., parks, bodies of water, buildings, parking lots, points of interest, etc) are represented as polygons. The shape of each polygon is described by a closed border comprising a series of vertices and segments that connect those vertices. One dimensional objects (e.g., streets and roads) are typically represented in the map data as polylines. Each polyline is described with a series of vertices and segments that connect those vertices. The data representation for each vertex includes a set of coordinates (e.g. latitude and longitude or other coding that can be associated with a specific geographic location). Vertices may exist at any granularity along the border of the polygon, such as at one meter distances. Polylines may intersect with other polylines, similar to how roads intersect with other roads. Further, polygons may intersect with other polygons, or a polyline may intersect with a polygon.

When displayed in a map, a polygon may appear to neighbor (i.e. be located nearby to) other objects such as polylines or other polygons. These other objects are referred to herein as "neighboring objects." In the map, the border of the polygon may appear to run roughly parallel to the neighboring objects. Additionally, the neighboring objects may appear to form a loose boundary around the polygon by surrounding the polygon on all or most sides. The border of the polygon may not be perfectly aligned with the neighboring objects. As a result, discrepancies, such as open spaces, appear between the polygon and the neighboring objects.

The server 105 executes an alignment module 120 for reducing discrepancies between polygons and neighboring objects, such as polylines and other polygons. The alignment module 120 generally processes polygons in the map data one at a time, operating in a batch mode.

Figure 2A:
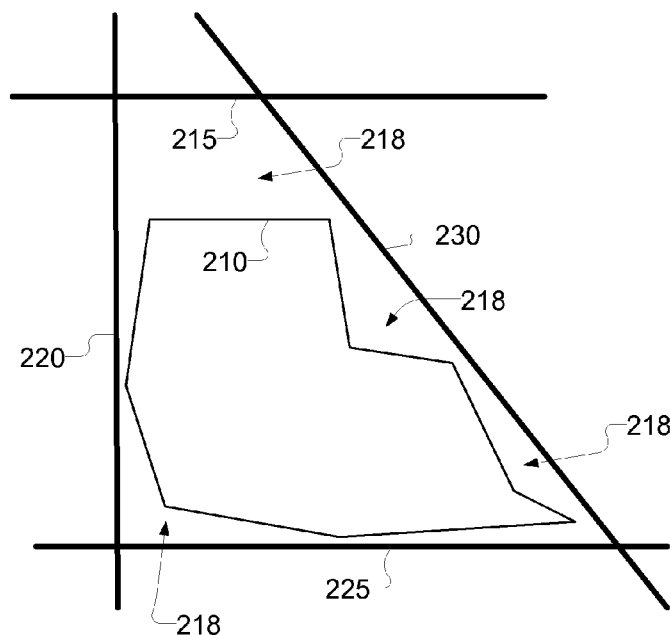
FIG. 2A and FIG. 2B illustrate a polygon before it is adjusted and a polygon after it is adjusted according to one embodiment.

The alignment module 120 begins by selecting a polygon of interest for processing. For example, referring to FIG. 2A, illustrated is a polygon before alignment. As shown, a polygon 210 is nearby and surrounded by four polylines 215-230. The border of the polygon 210 appears jagged, resulting in unsightly open spaces 218 between the polygon 210 and the adjacent polylines 215-230.

Figure 2B:
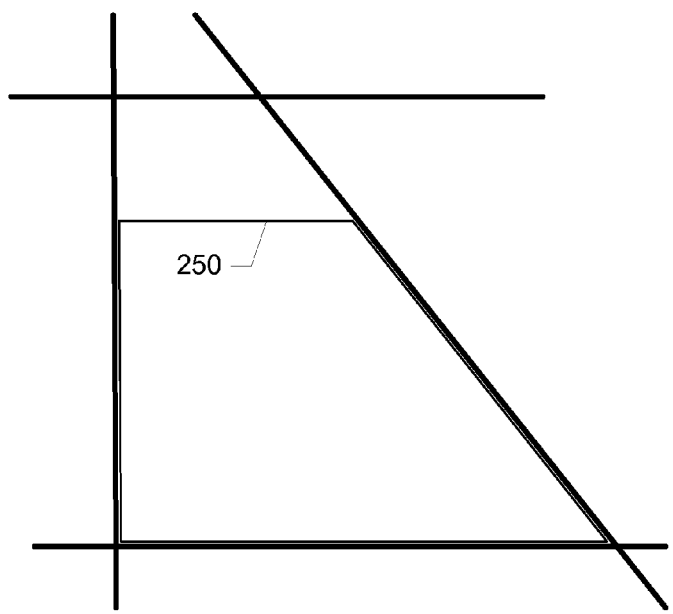

To reduce the number of open spaces, the alignment module 120 adjusts the border of the polygon to align it with neighboring objects while still maintaining the overall shape of the polygon. In one embodiment, the alignment module 120 repeatedly adjusts the vertices of the polygon until a cost function converges on a minimum value. For example, referring to FIG. 2B, illustrated is the polygon of FIG. 2A after the borders of the polygon are aligned. As shown, the alignment module 120 revises the borders of polygon 210 to align it with nearby polylines such that most of the open spaces have been eliminated. The cost function is computed with several heuristics that are referred to herein as geometric similarity, shape smoothness, feature fit, corner fit, and vertex displacement. Each of these heuristics will be described in greater detail below.

The alignment module 120 then stores the revised polygon into the map data repository 110. The client 130 can execute a map editor 135 to retrieve and further edit the polygon, or to display the polygon in a digital map. By aligning polygon borders in this manner, polygon shaped objects (e.g., parks and lakes) can be quickly aligned with neighboring objects in order to improve map rendering quality without distorting the overall appearance of the original polygons.

Process of Automatic Border Alignment

Figure 4:
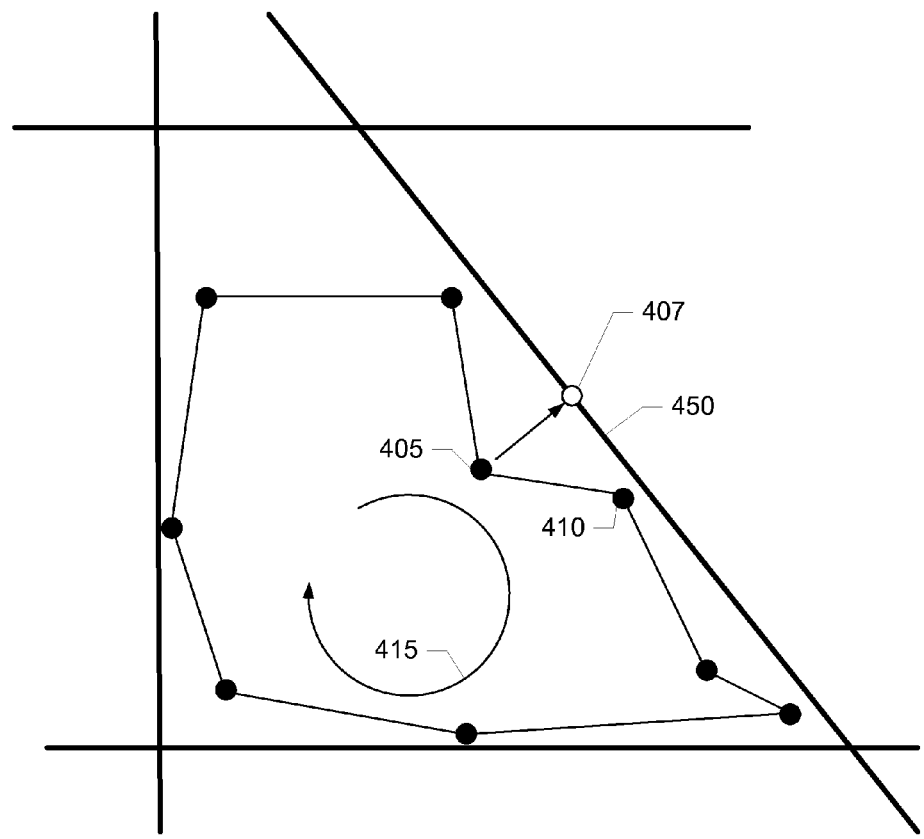
FIG. 4 illustrates adjusting the shape of a polygon according to one embodiment.

Turning now to FIG. 4, illustrated is a process flow diagram of steps performed by the alignment module 120, according to one embodiment. First, the alignment module 120 selects 305 a polygon of interest from the polygons in the map data repository 110. If operating in batch mode, the alignment module 120 can automatically select a polygon for processing, for example, iteratively processing all polygons with a given region. Alternatively, the identification module CC10 can select a polygon in response to a user input (e.g. from the client 130) that selects a particular polygon. The selected polygon is then received by the alignment module 120 for processing.

The alignment module 120 adjusts 310 the shape of the polygon in order to align the border of the polygon with neighboring objects while still maintaining the overall appearance of the polygon. As discussed above, the shape of a polygon is represented by a series of vertices and edges that connect those vertices. In one embodiment, the alignment module 120 repeatedly adjusts the vertices of the polygon until a cost function is minimized using a "greedy" algorithm that makes locally optimal choices in order to find a globally optimal solution. In other words, the alignment module 120 attempts to identify the optimal location for a single vertex, given the locations of all other vertices of the polygon, before identifying the optimal locations of the other vertices. The location of a given vertex is optimized using a cost function, as further described below. As shown, adjusting the shape of a polygon itself includes multiple steps.

Generally, the alignment module 120 iterates over each vertex in the polygon. Starting with a given vertex ("a target vertex") of the polygon, the alignment module identifies 320 a new position for the target vertex that minimizes a cost function. In one embodiment, the cost function is a local cost function that represents only the cost associated with the target vertex. In another embodiment, the cost function is a global cost function that represents the overall cost for the entire polygon, given the current location of all of its vertices. These cost functions will explained in greater detail below.

In one embodiment, to identify 320 the minimum cost location of the target vertex, the alignment module 120 starts at the original position of the target vertex and incrementally searches outwards in a spiral or other pattern. At each new position, the alignment module 120 computes a cost using a cost function based on the new position of the target vertex. The alignment module 120 continues to search in this manner until a position of the target vertex that minimizes a cost function is identified. In another embodiment, the alignment module starts with the position of the target vertex and searches positions along a line in the direction of the closest neighboring object until it identifies the minimum cost position. For example, FIG. 4 illustrates adjusting the shape of a polygon. As shown, vertex 405 is the target vertex and polyline 450 is the closest object to the target vertex 405. The alignment module 120 identifies the lowest cost position for target vertex 405 by searching in the direction of polyline 450. Alternatively, the alignment module 120 can start the search at a location on a neighboring object that is closest to the target vertex. For example, referring again to FIG. 4, the alignment module can search for the lowest cost position for target vertex 405 starting at position 407 on polyline 450, and then moving incrementally back towards the current location for the target vertex 405.

Figure 3:
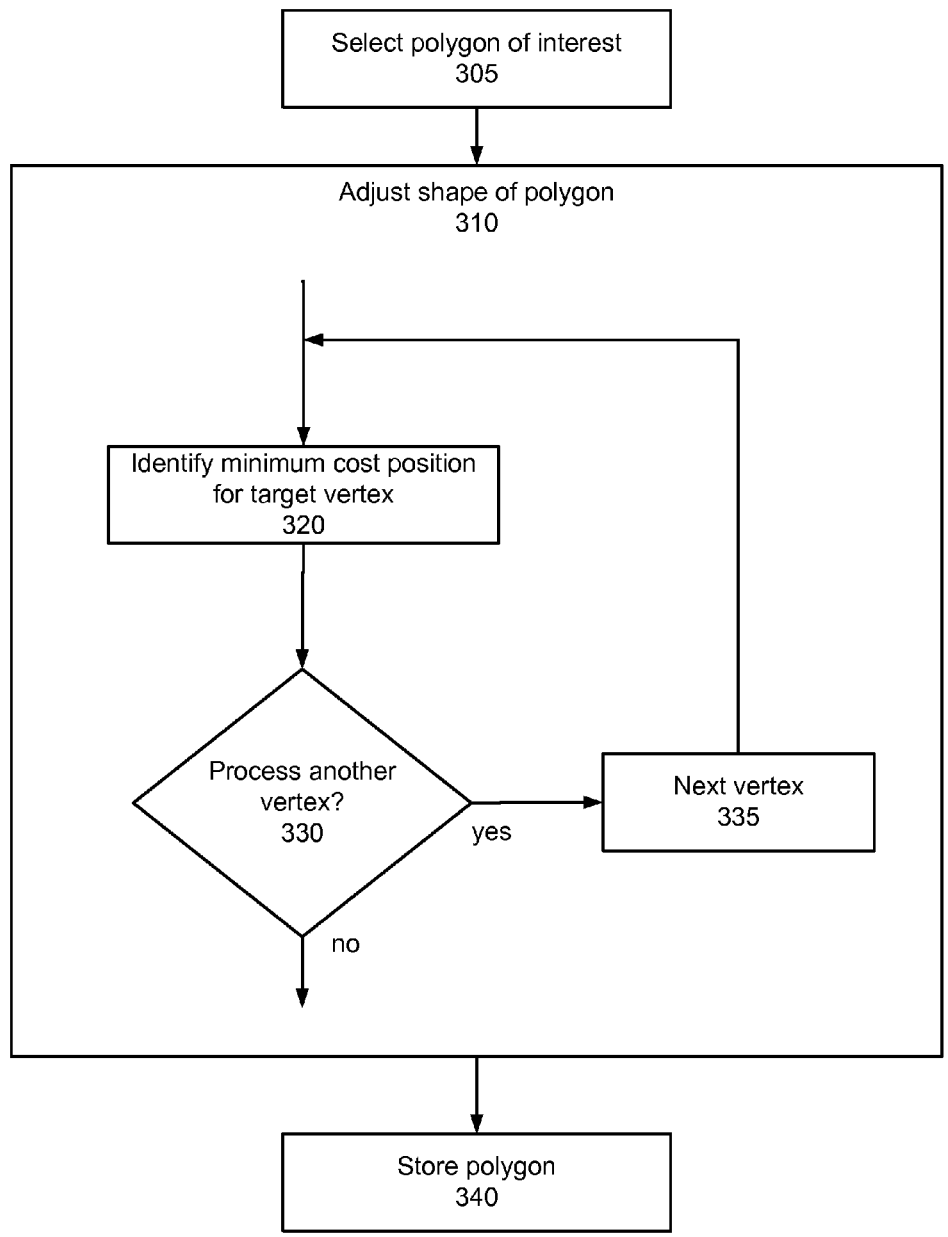
FIG. 3 is a process flow diagram for steps performed by the alignment module according to one embodiment.

Referring back to FIG. 3, once the lowest cost position for the target vertex is identified 320, the alignment module determines 330 whether to process (i.e. identify the minimum cost position for) another vertex. Generally speaking, the alignment module 120 iterates around the polygon from vertex to vertex, identifying the minimum cost position for each vertex one at a time. In one embodiment, the alignment module 120 iterates in a clockwise or counter-clockwise manner to select the next vertex 335. For example, referring again to FIG. 4, once the minimum cost position for vertex 405 is identified, the alignment module 120 chooses the next vertex in a clockwise 415 direction as the target vertex. As a result, vertex 410 is selected as the next target vertex.

However, identifying a new position for one vertex can indirectly affect the minimum cost position of adjacent vertices. Thus, a position for a vertex that was previously identified as a minimum cost position may no longer be the true minimum cost position after the other vertices are processed. For example, if new position is identified for vertex 410, it can affect the minimum cost position that was identified for vertex 405. To compensate, the alignment module 120 makes multiple passes through a polygon. With each pass, the alignment module 120 re-identifies the minimum cost positions for the vertices. This continues until the overall cost of the polygon as determined by the global cost function, is decreasing by less than some threshold amount with each pass (i.e. the costs converge). Once the cost converges, it is determined 330 that no other vertices need to be processed and the process continues to step 340.

Once the cost as determined by a cost function has converged, the alignment process is complete. In step 340, the alignment module 120 stores the updated polygon data, including the new positions of the vertices, into the map data repository 110. The polygon may be further edited by a user of the map editing system or output for display in a digital map.

As discussed above, the alignment module 120 computes a cost for the location of one or more vertices using a cost function. To compute a local cost for a single vertex (e.g., a target vertex), the alignment module 120 computes separate costs for the vertex that are based on different heuristics and combines them into a single cost. In one embodiment, the local cost function for a single vertex can be expressed with the following formula:

$$VertexCost = a \times GS + b \times SS + c \times FF + d \times CF + e \times VD$$

Where VertexCost is the cost associated with a single vertex. GS is the cost associated with geometric similarity. SS is the cost associated with shape smoothness. FF is the cost associated with feature fit. CF is the cost associated with corner fit. VD is the cost associated with vertex displacement. The weight for each individual cost component is represented by a, b, c, d, and e. Each of these individual costs will be explained in greater detail To compute the overall cost for the entire polygon, the alignment module 120 computes the costs for each of the individual vertices of the polygon and combines them into an overall cost. In one embodiment, the global cost function for computing the overall cost of the entire polygon can be expressed with the following formula:

$$PolygonCost = \sum_{i=0}^{i=n} VertexCost_i$$

Where PolygonCost is the overall cost of a polygon, n is the total number of vertices in the polygon, and VertexCost is evaluated at each vertex i.

The GS (geometric similarity) portion of the cost function attempts to maintain the similarity between the geometry of the polygon before its shape is adjusted (the "original polygon") and the geometry of the polygon after its shape is adjusted (the "adjusted polygon") by penalizing changes in geometry. For example, if the original polygon was a rhombus, the adjusted polygon should also be a rhombus and not a parallelogram. Thus, the cost increases as the changes in geometry increase.

In one embodiment, the GS portion of the cost function is the absolute value of the angular difference between an angle at a vertex of the original polygon and an angle at the corresponding vertex in the adjusted polygon. The angle can be either the interior or exterior angle, so long as it is consistently applied. A large difference in angle is an indication that the geometry of the polygon has changed and is penalized with a higher cost.

Figure 5A:
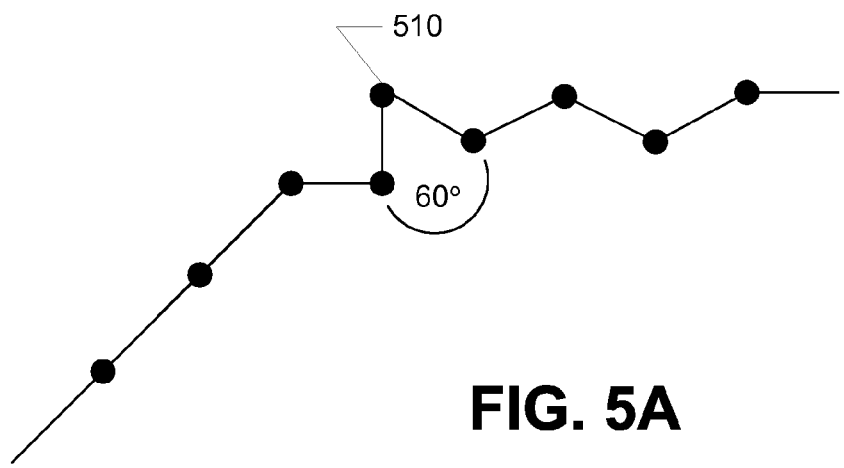
FIGS. 5A-5D illustrate computing the cost associated with geometric similarity according to one embodiment.
Figure 5B:
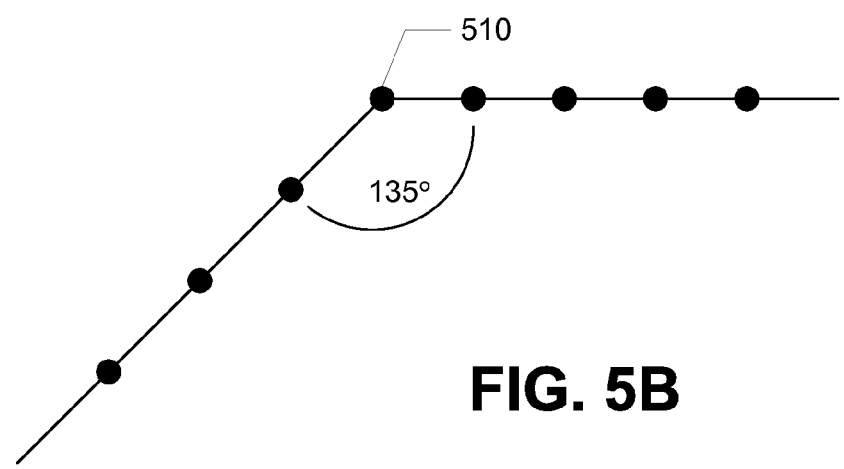

In one embodiment, an angle is measured between a vertex and its immediate adjacent vertices. For example, FIGS. 5A and 5B illustrate computing the cost associated with geometry similarity according to one embodiment. FIG. 5A shows a portion of an original polygon and FIG. 5B shows a portion of an adjusted polygon. In the figures, geometric similarity is being computed with respect to vertex 510. In the original polygon of FIG. 5A, the angle of the edges connected to vertex 510 and its adjacent vertices is 60 degrees. In the adjusted polygon of FIG. 5B, the angle of the edges connecting vertex 510 to its adjacent vertices is 135 degrees. Thus, the GS cost for vertex 510 is the absolute value of the difference, which is 75 degrees.

In another embodiment, the alignment module 120 measures angles between a vertex of a polygon and non-adjacent vertices, or between a vertex of a polygon and locations on the polygon that are at some pre-defined distance from the vertex. Measuring angles using non-adjacent vertices or pre-determined distances helps to eliminate noise, or minor variations in angle that do not affect the overall geometry of the polygon.

Figure 5C:
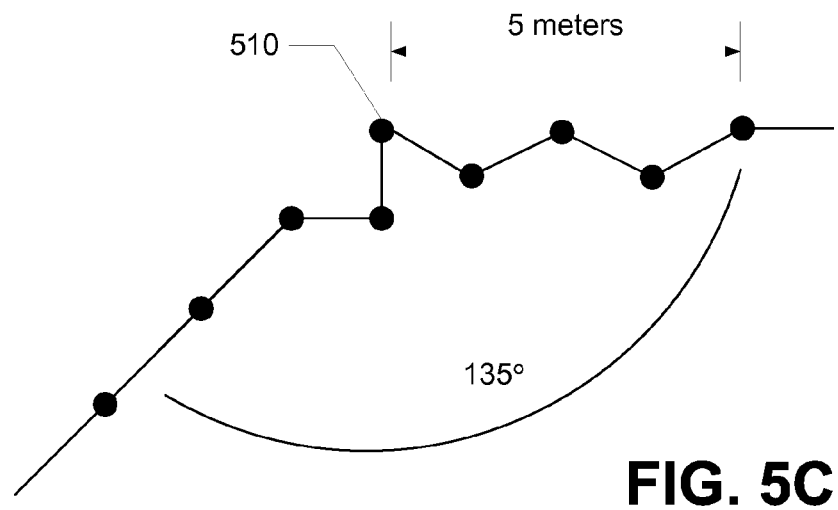
Figure 5D:
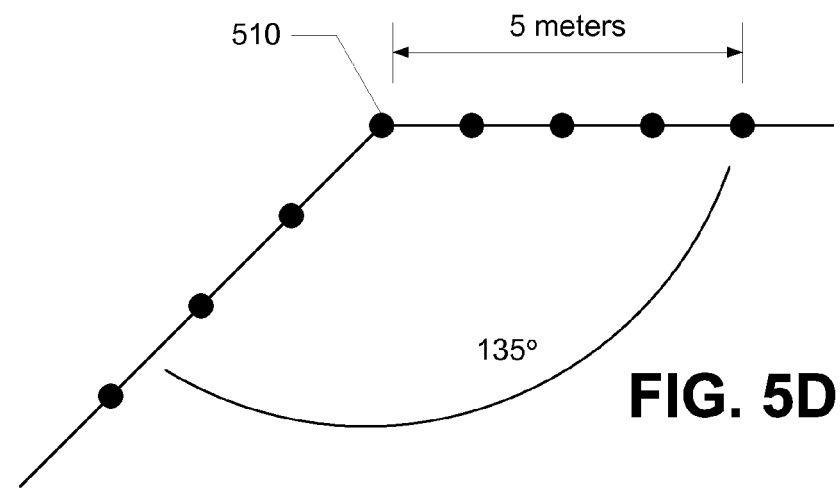

For example, FIGS. 5C and 5D, illustrate computing the cost associated with geometric similarity according to one embodiment. FIG. 5C shows a portion of a polygon before it is adjusted and FIG. 5D shows a portion of a polygon after it is adjusted. Geometric similarity is being computed with respect to vertex 510. In the original polygon of FIG. 5C, the angle is measured between vertex 510 and a location on the polygon that is five meters away from the vertex. The angle defined by these measurement points is 135 degrees. In the adjusted polygon of FIG. 5B, the angle defined by measuring at a five meter distance is also 135 degrees. Thus, the GS cost for vertex 510 is 0 degrees. As shown by these examples, even though the changes between polygon 5A and 5B and the changes between polygon 5C and 5D are identical, the geometric similarity cost varies greatly depending on how the angles are measured in the GS function.

The SS (shape smoothness) portion of the cost function attempts to create a polygon that has straight or smooth borders by penalizing polygons with rough borders. Thus, the smoother the polygon, the lower the cost of the polygon. In one embodiment, the SS portion of the cost function is the absolute value of the difference between an ideal angle, such as 180 degrees, and the actual angle at a vertex. The angle can be either the interior or exterior angle, so long as it is consistently applied.

Figure 6:
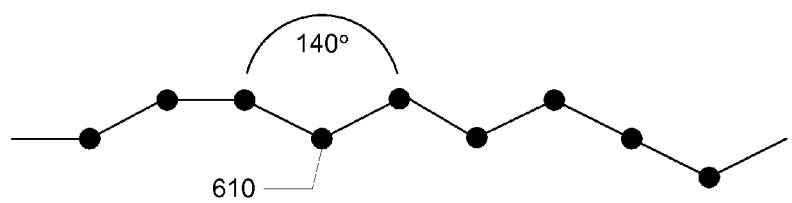
FIG. 6 illustrates computing the cost associated with polygon smoothness according to one embodiment.

For example, FIG. 6 illustrates computing the cost associated with shape smoothness according to one embodiment. Shown in the figure is a portion of a border of a polygon. Shape smoothness is being computed with respect to vertex 610. The angle between vertex 610 and its adjacent vertices is equal to 140 degrees. Alternatively, the angle can be measured between a vertex and non-adjacent vertices or between a vertex and locations on the polygon that are at some pre-defined distance from the vertex. Assuming that the ideal angle is 180 degrees, there is a difference of 40 degrees. As such, the cost of vertex 610 is 40 degrees.

The FF (feature fit) portion of the cost function attempts to reduce any open spaces between a polygon border and neighboring objects. Thus, if there is a close fit between a vertex of a polygon and a neighboring object, the cost of the vertex will be low. Feature fit is accounted for by measuring the distance between a vertex of the adjusted polygon and the neighboring object that is closest to the vertex. The FF portion of the cost function is directly related to this distance according to some pre-defined mathematical relationship.

Figure 7:
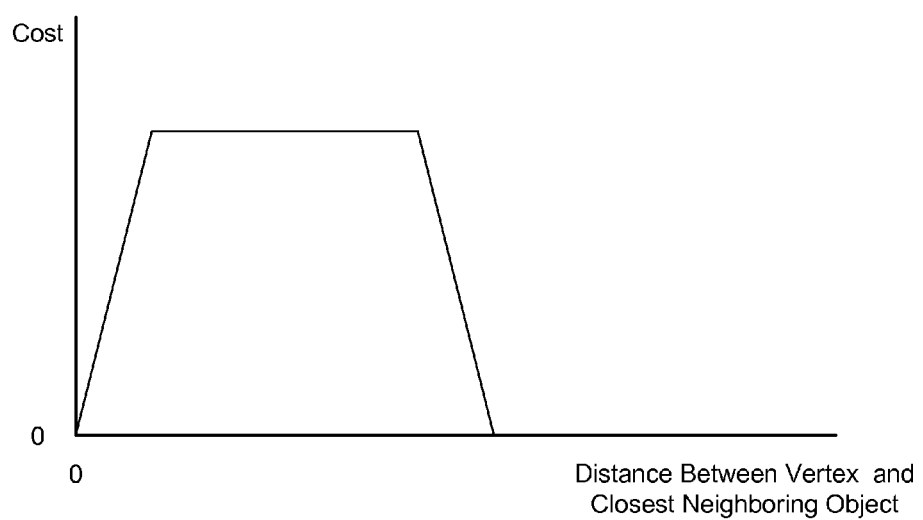
FIG. 7 illustrates a cost relationship for feature fit according to one embodiment.

For example, FIG. 7 illustrates a cost relationship for feature fit according to one embodiment. Shown in the figure is a graph of the relationship between cost and distance. As shown on the left side of the graph, the cost of a vertex decreases as the distance to the closest neighboring object approaches zero. The cost is at its lowest when the vertex lines up exactly with the neighboring object, thereby eliminating any open space between the objects. As shown on the right side of the graph, large distances are generally not penalized with an increased cost. Large distances do not represent open spaces that appear as unsightly visual noise, but represent open spaces that should not be eliminated. Alternatively, the alignment module 120 can measure the distance between an edge of a polygon (as opposed to a vertex) and the closest neighboring object and use this measurement to compute the feature fit cost.

Figure 8:
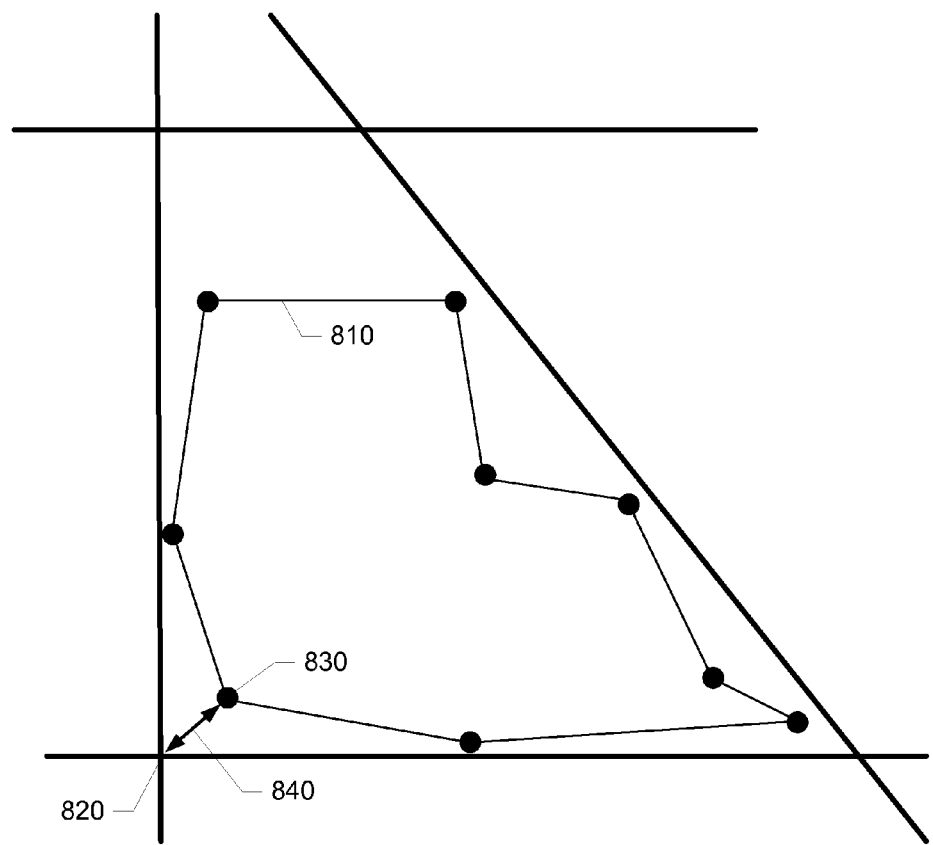
FIG. 8 illustrates computing the cost associated with corner fit according to one embodiment.

The CF (corner fit) portion of the cost function attempts to reduce open spaces between a polygon border and the intersection of two or more neighboring objects. Corner fit is accounted for by measuring the distance between a vertex of a polygon and the closest intersection. For example, FIG. 8 illustrates how to compute the cost associated with corner fit according to one embodiment. Shown in the figure is a polygon 810 that is located near an intersection 820 of two polylines. The distance between vertex 830 and intersection 820 is represented by arrow 840. The CF portion of the cost function is directly related to the distance 840 according to some pre-defined mathematical relationship. In one embodiment, the relationship between corner fit cost and distance is similar to the relationship illustrated in the graph of FIG. 7.

Figure 9:
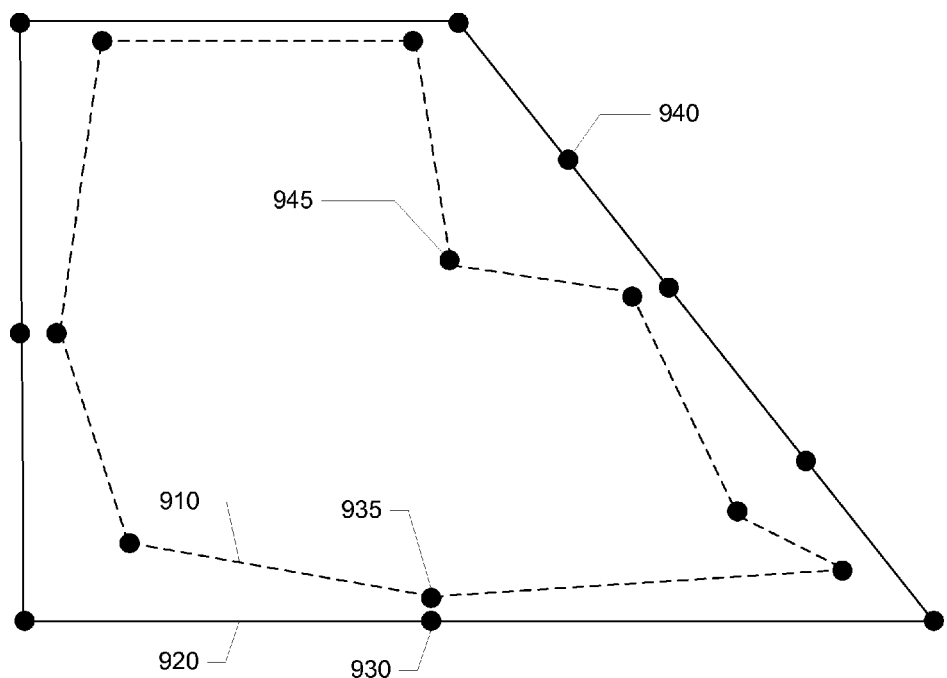
FIG. 9 illustrates computing the cost associated with vertex displacement according to one embodiment.

The VD (vertex displacement) portion of the cost function attempts to reduce any changes to the size or position of the original polygon by penalizing such changes. In one embodiment, the VD portion of the cost function is the distance (e.g. meters, feet) between a vertex of the original polygon and the corresponding vertex of the adjusted polygon. For example, FIG. 9 illustrates how to compute the cost associated with vertex displacement according to one embodiment. As shown in the figure, polygon 910 is the original polygon and polygon 920 is the adjusted polygon. The vertex displacement cost of vertex 930 is the distance between vertex 930 and 935. The vertex displacement cost of vertex 940 is the distance between 945 and 940.

In another embodiment, instead of individually computing the VD cost for each vertex, the alignment module 120 can compute the VD cost for the entire polygon (the "polygon displacement cost") at once. The alignment module 120 can compute the polygon displacement cost by computing the overlap in area between the original polygon and the adjusted polygon. The overlap is subtracted from the total area of the adjusted polygon. The resulting number represents a change in area/position between the original and adjusted polygon. The number is scaled (e.g. between 0 and 100) to create a polygon displacement cost that is included as a part of the function for computing Polygon Cost. For example, referring again to FIG. 9, the alignment module 120 can measure the overlap in area of original polygon 910 and adjusted polygon 920, which in this figure is equal to the entirety of original polygon 910. The area of polygon 910 is then subtracted from the area of polygon 920 to identify the change in area or position, which is then scaled to create the polygon displacement cost.

The disclosed embodiments thus allow for geometric objects, such as polygons and polylines, to be aligned with each other to eliminate open spaces. As result, map rendering quality is increased. Furthermore, by reducing discrepancies with a cost function, open spaces can be eliminated without distorting the overall appearance of the original polygon.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "identifying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for aligning the borders of geometric objects. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for aligning borders of geometric objects in a digital map, comprising:
    selecting a polygon corresponding to an object in the digital map that neighbors a plurality of other objects, the selected polygon having a border, the plurality of other objects comprising at least one of a polyline and polygon;
    adjusting, by a computer system, the border of the selected polygon until a cost computed by a cost function converges on a value, wherein the cost function computes the cost based at least in part on a difference between the border of the selected polygon and the plurality of other objects; and
    storing the adjusted border of the polygon.

2. The method of claim 1, wherein adjusting the border of the selected polygon comprises adjusting a location of a selected vertex of the selected polygon to minimize the cost computed by the cost function, the cost function computing the cost based on the location of the selected vertex.

3. The method of claim 1, wherein adjusting the border of the selected polygon comprises adjusting a location of a selected vertex of the selected polygon to minimize the cost computed by cost function, the cost function computing the cost based on locations of all vertices of the selected polygon.

4. The method of claim 1, wherein a difference between the border of the selected polygon and the plurality of objects comprises a distance between the border of the selected polygon and at least one of the plurality of objects.

5. The method of claim 4, wherein the distance comprises a distance between a vertex of the selected polygon and an object of the plurality of objects that is closest to the selected polygon.

6. The method of claim 1, wherein the difference between the border of the selected polygon and the plurality of objects comprises a distance between the border of the selected polygon and an intersection of at least two of the plurality of objects.

7. The method of claim 6, wherein the distance comprises a distance between a vertex of the selected polygon and an intersection of at least two of the plurality of objects that is closest to the selected polygon.

8. The method of claim 1, wherein the cost function further computes the cost based on a difference between a first polygon border before the border of the selected polygon is adjusted and a second polygon border after the border of the selected polygon is adjusted.

9. The method of claim 8, wherein a difference between a first polygon border and a second polygon border comprises a difference between a geometry of the first polygon border and a geometry of the second polygon border.

10. The method of claim 9, wherein a difference between a geometry of the first polygon border and a geometry of the second polygon border comprises a difference between an angle at a vertex of the first polygon border and an angle at a corresponding vertex of the second polygon border.

11. The method of claim 8, wherein a difference between a first polygon border and a second polygon border comprises a displacement of the second polygon border relative to the first polygon border.

12. The method of claim 11, wherein a displacement of the second polygon border relative to the first polygon border comprises a distance between a vertex of the first polygon border and a corresponding vertex of the second polygon border.

13. The method of claim 1, wherein the cost function further computes the cost based on a smoothness of the selected polygon border.

14. The method of claim 13, wherein a smoothness of the selected polygon border comprises a difference between an angle at a vertex of the border and a pre-determined angle.

15. A non-transitory computer-readable storage medium storing executable computer program instructions for aligning borders of geometric objects in a digital map, the computer program instructions comprising instructions for:
    selecting a polygon corresponding to an object in the digital map that neighbors a plurality of other objects, the selected polygon having a border, the plurality of other objects comprising at least one of a polyline and polygon;
    adjusting the border of the selected polygon until a cost computed by a cost function converges on a value, wherein the cost function computes the cost based at least in part on a difference between the border of the selected polygon and the plurality of other objects; and
    storing the adjusted border of the polygon.

16. The computer-readable storage medium of claim 15, wherein adjusting the border of the selected polygon comprises adjusting a location of a selected vertex of the selected polygon to minimize the cost computed by the cost function, the cost function computing the cost based on the location of the selected vertex.

17. The computer-readable storage medium of claim 15, wherein adjusting the border of the selected polygon comprises adjusting a location of a selected vertex of the selected polygon to minimize the cost computed by cost function, the cost function computing the cost based on locations of all vertices of the selected polygon.

18. The computer-readable storage medium of claim 15, wherein a difference between the border of the selected polygon and the plurality of objects comprises a distance between the border of the selected polygon and at least one of the plurality of objects.

19. The computer-readable storage medium of claim 18, wherein the distance comprises a distance between a vertex of the selected polygon and an object of the plurality of objects that is closest to the selected polygon.

20. The computer-readable storage medium of claim 15, wherein the difference between the border of the selected polygon and the plurality of objects comprises a distance between the border of the selected polygon and an intersection of at least two of the plurality of objects.

21. The computer-readable storage medium of claim 20, wherein the distance comprises a distance between a vertex of the selected polygon and an intersection of at least two of the plurality of objects that is closest to the selected polygon.

22. The computer-readable storage medium of claim 15, wherein the cost function further computes the cost based on a difference between a first polygon border before the border of the selected polygon is adjusted and a second polygon border after the border of the selected polygon is adjusted.

23. The computer-readable storage medium of claim 22, wherein a difference between a first polygon border and a second polygon border comprises a difference between a geometry of the first polygon border and a geometry of the second polygon border.

24. The computer-readable storage medium of claim 23, wherein a difference between a geometry of the first polygon border and a geometry of the second polygon border comprises a difference between an angle at a vertex of the first polygon border and an angle at a corresponding vertex of the second polygon border.

25. The computer-readable storage medium of claim 22, wherein a difference between a first polygon border and a second polygon border comprises a displacement of the second polygon border relative to the first polygon border.

26. The computer-readable storage medium of claim 25, wherein a displacement of the second polygon border relative to the first polygon border comprises a distance between a vertex of the first polygon border and a corresponding vertex of the second polygon border.

27. The computer-readable storage medium of claim 15, wherein the cost function further computes the cost based on a smoothness of the selected polygon border.

28. The computer-readable storage medium of claim 27, wherein a smoothness of the selected polygon border comprises a difference between an angle at a vertex of the border and a pre-determined angle.

29. A system for aligning borders of geometric objects in digital map, the system comprising:
a non-transitory computer-readable storage medium storing executable computer program instructions comprising instructions for:
selecting a polygon corresponding to an object in the digital map that neighbors a plurality of other objects, the selected polygon having a border, the plurality of other objects comprising at least one of a polyline and polygon;
adjusting the border of the selected polygon until a cost computed by a cost function converges on a value, wherein the cost function computes the cost based at least in part on a difference between the border of the selected polygon and the plurality of other objects; and
storing the adjusted border of the polygon; and
a processor for executing the computer program instructions.

30. The system of claim 29, wherein adjusting the border of the selected polygon comprises adjusting a location of a selected vertex of the selected polygon to minimize the cost computed by the cost function, the cost function computing the cost based on the location of the selected vertex.

31. The system of claim 29, wherein adjusting the border of the selected polygon comprises adjusting a location of a selected vertex of the selected polygon to minimize the cost computed by cost function, the cost function computing the cost based on locations of all vertices of the selected polygon.

32. The system of claim 29, wherein a difference between the border of the selected polygon and the plurality of objects comprises a distance between the border of the selected polygon and at least one of the plurality of objects.

33. The system of claim 32, wherein the distance comprises a distance between a vertex of the selected polygon and an object of the plurality of objects that is closest to the selected polygon.

34. The system of claim 29, wherein the difference between the border of the selected polygon and the plurality of objects comprises a distance between the border of the selected polygon and an intersection of at least two of the plurality of objects.

35. The system of claim 34, wherein the distance comprises a distance between a vertex of the selected polygon and an intersection of at least two of the plurality of objects that is closest to the selected polygon.

36. The system of claim 29, wherein the cost function further computes the cost based on a difference between a first polygon border before the border of the selected polygon is adjusted and a second polygon border after the border of the selected polygon is adjusted.

37. The system of claim 36, wherein a difference between a first polygon border and a second polygon border comprises a difference between a geometry of the first polygon border and a geometry of the second polygon border.

38. The system of claim 37, wherein a difference between a geometry of the first polygon border and a geometry of the second polygon border comprises a difference between an angle at a vertex of the first polygon border and an angle at a corresponding vertex of the second polygon border.

39. The system of claim 36, wherein a difference between a first polygon border and a second polygon border comprises a displacement of the second polygon border relative to the first polygon border.

40. The system of claim 39, wherein a displacement of the second polygon border relative to the first polygon border comprises a distance between a vertex of the first polygon border and a corresponding vertex of the second polygon border.

41. The system of claim 29, wherein the cost function further computes the cost based on a smoothness of the selected polygon border.

42. The system of claim 41, wherein a smoothness of the selected polygon border comprises a difference between an angle at a vertex of the border and a pre-determined angle.

* * * * *